I. E. PALMER.
BEARING.
APPLICATION FILED JAN. 2, 1909.

979,881.

Patented Dec. 27, 1910.
2 SHEETS—SHEET 1.

Witnesses:
William C. Glass
Robert H. Kammler

Inventor:
Isaac E. Palmer
by Emery and Booth, Att'ys

I. E. PALMER.
BEARING.
APPLICATION FILED JAN. 2, 1909.
979,881.
Patented Dec. 27, 1910.
2 SHEETS—SHEET 2.
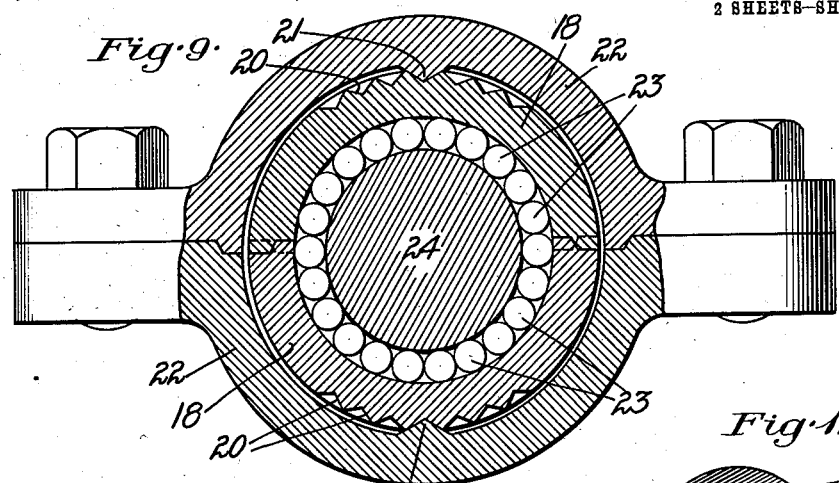
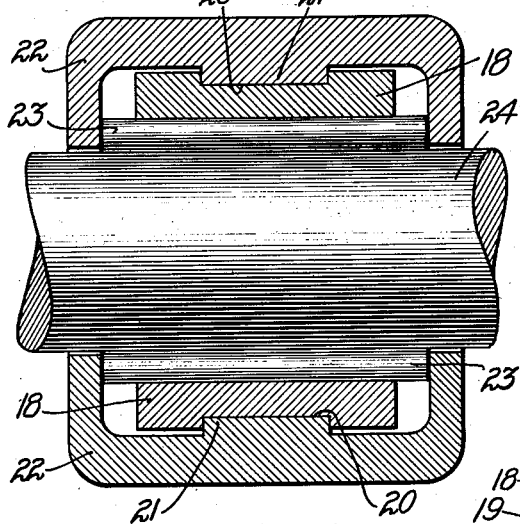
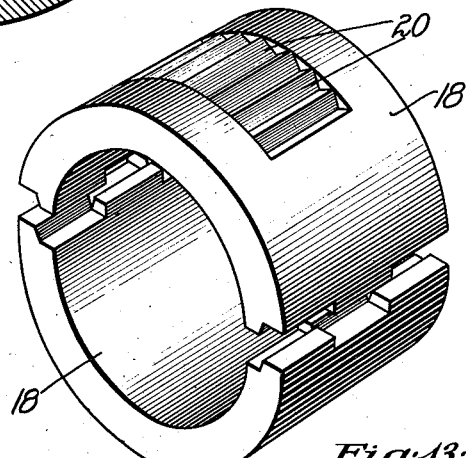
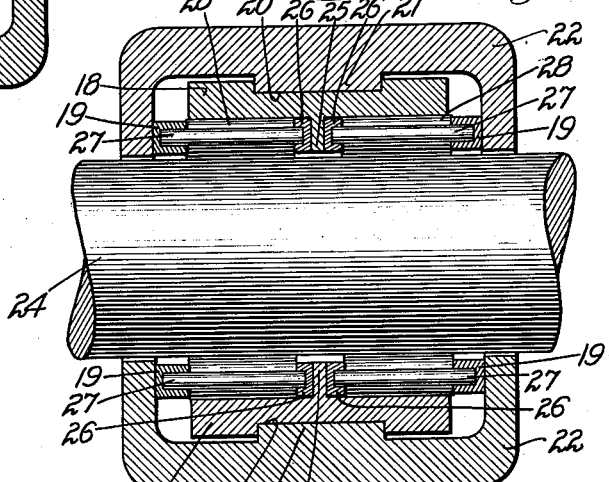
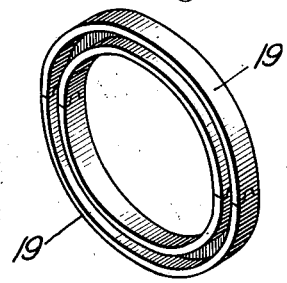
Witnesses:
William C. Glass.
Robert H. Kammler.
Inventor:
Isaac E. Palmer
by Emery and Booth, Att'ys

UNITED STATES PATENT OFFICE.

ISAAC E. PALMER, OF MIDDLETOWN, CONNECTICUT.

BEARING.

979,881.  Specification of Letters Patent.  Patented Dec. 27, 1910.

Application filed January 2, 1909. Serial No. 470,312.

*To all whom it may concern:*

Be it known that I, ISAAC E. PALMER, a citizen of the United States, and a resident of Middletown, in the county of Middlesex and State of Connecticut, have invented an Improvement in Bearings, of which the following description, in connection with the accompanying drawings, is a specification, like letters on the drawings representing like parts.

This invention relates to shaft and other bearings and may be of general application.

The object of the invention is to provide a self-contained bearing as an article of manufacture and which may be readily applied to a shaft or other rotary member, and which is of few parts and simple construction.

The bearing constructed in accordance with my invention presents a minimum of frictional surface, and the rotary bearing members forming a part thereof may be not only mutually supporting but may be readily inserted in or withdrawn from position.

In order that the principles of the invention may be readily understood, I have illustrated certain embodiments of my invention in the accompanying drawings, wherein—

Figure 1:
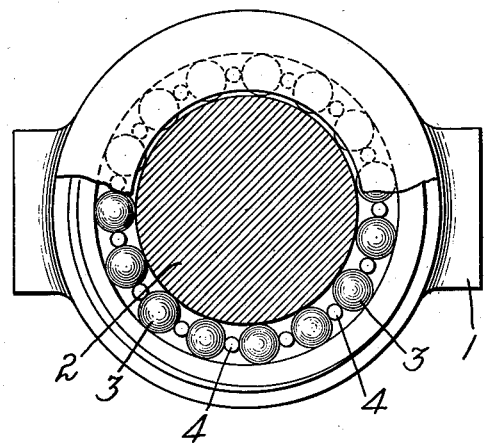
Figure 3:
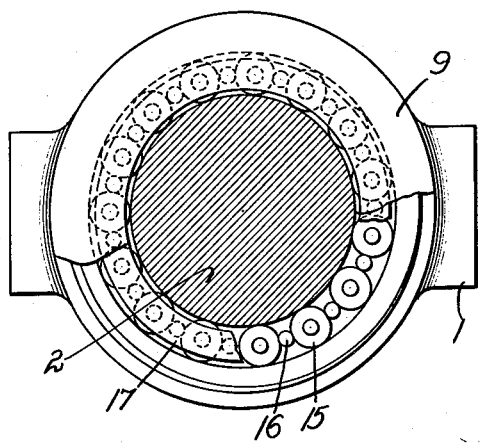
Figure 2:
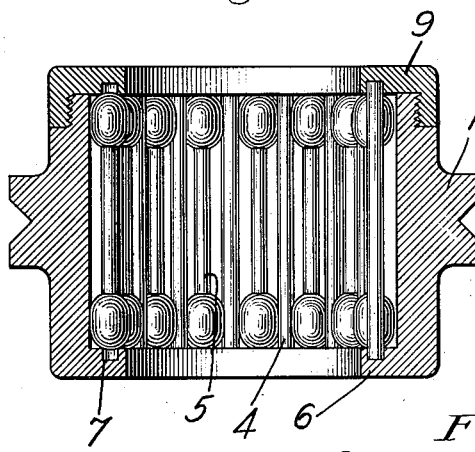
Figure 4:
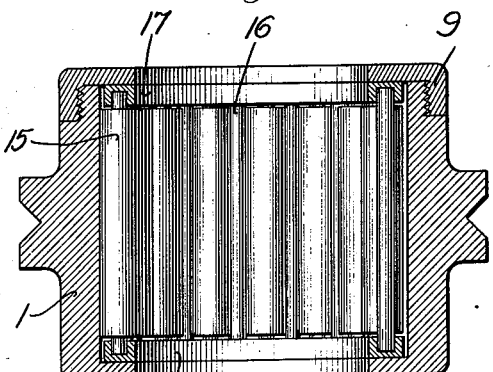
Figure 7:
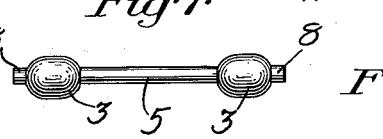
Figure 5:
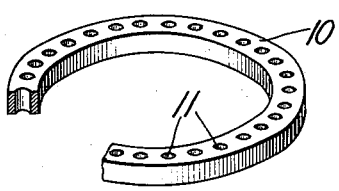
Figure 6:
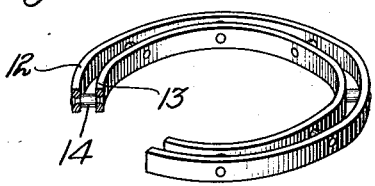
Figure 8:
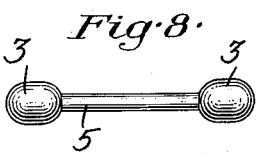

Figure 1 is an end elevation of a bearing embodying my invention, a portion of one end being removed to disclose the interior construction; Fig. 2 is a cross section of the bearing represented in Fig. 1; Fig. 3 is a view similar to Fig. 1, of another form of my invention; Fig. 4 is a cross section thereof; Fig. 5 is a perspective view of one form of gudgeon or supporting ring that may be employed with certain forms of my invention; Fig. 6 is a similar view of another form of gudgeon; Figs. 7 and 8 are side elevations of forms of bearing members that may be employed in the practice of my invention; Fig. 9 is a cross section of another form of my invention showing the parts assembled; Fig. 10 is a longitudinal section of the parts shown in Fig. 9; Fig. 11 is a perspective view of the parts of the divided sleeve; Fig. 12 is a similar view of one of the split end rings or gudgeons; and Fig. 13 is a longitudinal section of a further modified form of my invention showing divided rollers.

The embodiment of my invention herein disclosed comprises a sleeve or bushing which may be divided in certain forms, and a series of rotary bearing members positioned as an annulus within the sleeve or bushing wherein they may be placed so as to be as a series self-supporting, and, as individual members of the series may be mutually supporting; or wherein they may be placed with their ends received within a ring or support, or within supporting formations of the sleeve or bushing itself.

Referring first to the form of my invention represented in Figs. 1 and 2, the sleeve or bushing is represented at 1; it being of any suitable material and construction and adapted to be received in any suitable support, as, for example, a divided bearing box, or used in any other desired manner. Within the bushing I assemble in any suitable manner, as for example by the use of a temporary inner sleeve (not shown) about which the members may be placed, a series of rotary bearing members which, when assembled, present an annulus or ring to engage the shaft 2 or other part to which the bearing is to be applied. The series of rotary bearing members is represented as composed of rollers 3, contacting both with the shaft 2 and with the sleeve or bushing 1, alternated with rollers 4 of smaller diameter and which are free from contact with either the shaft or the sleeve or bushing, but contact only with the adjacent rollers 3. In this manner I reduce to a minimum the frictional engagement of the series of bearing members and the shaft and sleeve or bearing. In order still further to reduce the frictional engagement of the bearing members and the shaft and sleeve, I may, as shown in Figs. 2 and 7 and 8, provide the said rollers 3 with reduced intermediate portions 5, thereby presenting in effect rollers having enlarged heads which alone contact with the shaft, the sleeve or bushing, and the intermediate rollers 4; or, if desired, the rollers 3 may be of the form indicated in Fig. 8.

While the rollers 3 and 4 may be supported in position only by reason of their engagement with the shaft and sleeve and their mutual engagement, preferably I provide means for supporting the ends of one or both sets of rollers 3 and 4. For this purpose I have, in Fig. 2, represented one end of the bushing 1 as inwardly flanged, as shown at 6, and provided with a series of seats or sockets 7 to receive the ends of the rollers 4. The rollers 3 may be provided with reduced ends as represented at 8 in Fig. 7, and be received in said seats or sockets 7. The opposite end of the sleeve 1 is provided with a removable and preferably threaded cap 9, also preferably provided with seats or sockets to receive the ends of the rollers 4, and rollers 3 if desired. The diameter of the seats or sockets is, of course, such as to permit the free rotation of the rollers. If desired one or both ends of the rollers may be supported within supports placed within the sleeve, one form of such support being shown at 10 in Fig. 5, it being provided with suitable sockets or holes 11 to receive the ends of the bearing rollers. Other forms of support may be employed, as for example inner and outer rings 12 and 13 (see Fig. 6) held in spaced relation by rivets 14, thus affording a support for the ends of the bearing rollers. The rollers 3 may be of any suitable formation, as for example cylindrical throughout. In Fig. 4 I have shown at 15 such a type of roller, it having preferably reduced ends 16 which may be received in sockets within the sleeve or, and as here shown, in sockets in supports 17. The cap 9, when positioned, holds the rollers 3, 4 from longitudinal displacement.

In certain forms of my invention I contemplate the employment of a longitudinal split sleeve and end rings if the latter be used so as to permit the application of the bearing to a shaft without removal of the shaft. In this manner the bearing may be very quickly applied. In Figs. 9 to 12 inclusive, I have illustrated this form of my invention. In said figures the divided sleeve is indicated at 18—18, the meeting edges having suitable interlocking or interengaging formations as illustrated. If supports are employed, preferably they are formed as split rings, as shown at 19—19 in Fig. 12, the meeting edges also preferably having interlocking formations. Preferably I provide means to hold the divided sleeve in such position that the line of division of the sleeve is normal to the direction of strain or pull of the driving band or other driving means, thus preventing any tendency of the sections of the split sleeve to separate and interfere with the free action of the rollers. For this purpose I have represented in Figs. 9, 10 and 11 the members 18 of the divided sleeve as provided with a series of teeth 20 with which engage teeth 21 upon the members 22 of the divided box.

In Fig. 9, I have indicated rollers 23 which may be all of the same diameter and may be cylindrical throughout or of the general form indicated in Figs. 7 or 8. If desired, however, I may in this type of construction employ the two sets of rollers 3 and 4, such as indicated in Figs. 1 to 4 inclusive. That is to say, the sleeve or bearing shown in Figs. 1 to 4 inclusive may be divided and provided with positioning means such as shown in Figs. 9, 10 and 11.

In applying the bearing shown in Figs. 9 and 10 to a shaft, the lower half 18 of the sleeve having one half the rollers 23 resting therein is applied beneath the shaft 24. Then the upper half of the rollers 23 are placed upon the shaft and the upper half 18 of the sleeve is superimposed upon the rollers; then the two members 22—22 of the divided box may be applied and secured in position, or the lower member of such box may be positioned before the assembling of the other parts.

If desired, the rollers of any of the types of my invention herein illustrated may be divided intermediate their ends, as I have found in practice that in certain cases this reduces the friction of the parts. Such a construction is shown in Fig. 13, wherein the members 18 of the divided sleeve are provided with an inwardly projecting rib 25 which may be provided with holes or sockets to receive the ends of the divided rollers 27, 28. If desired, however, and as shown I may employ supports 26, preferably split, of any suitable type to receive the inner ends of the said rollers.

It will be apparent that the bearing herein represented is of few parts and of simple construction, and that it reduces to a minimum the frictional engagement of the shaft or other rotary member therewith. The rollers 3 are of the minimum number and the intermediate reduced rollers 4 present but little frictional resistance and that only to the rollers 3. By providing the rollers 3 with portions intermediate their ends and which do not bear upon the shaft 2 and the sleeve, it is apparent that the frictional engagement is reduced to an absolute minimum. Furthermore, in the form of my invention illustrated in Figs. 9 to 13 inclusive, the divided bearing may be applied to the shaft without removal of the shaft from the machine, it being necessary merely to remove the upper member 22 of the divided bearing box.

Having thus described one type or embodiment of my invention, I desire it to be understood that although specific terms are employed they are used in a generic and descriptive sense and not for purposes of limitation, the scope of the invention being set forth in the following claims.

1. As a new article of manufacture, a shaft bearing comprising a longitudinally divided box and a contained longitudinally divided sleeve or bushing, said box and sleeve each having formations adapted to interengage to maintain the sleeve in circumferential position and to prevent relative longitudinal movement of the box and sleeve, said formations being inclosed and concealed when the parts are assembled, any member of said divided sleeve being thereby adapted to be lifted radially therefrom and thus removed from the shaft upon separation of said divided bearing box and circumferential adjustment of said divided sleeve.

2. As a new article of manufacture a shaft bearing comprising a longitudinally divided box provided with one or more locking teeth upon its inner concaved surface and a longitudinally divided sleeve or bushing positioned within said box, one or both members of said divided sleeve or bushing having a plurality of superficial teeth to engage said tooth or teeth upon said divided box said teeth being inclosed and concealed when the parts are assembled and rotatable friction reducing elements positioned within said sleeve or bushing.

3. As a new article of manufacture, a shaft bearing comprising a longitudinally divided box, each of its members being provided with a locking tooth 21 between its outer edges, a longitudinally divided sleeve or bushing positioned within said box, each member of said sleeve or bushing having a plurality of superficial teeth 20 between its edges and within the lateral edges of said box and rotatable friction rollers 23 positioned within said sleeve or bushing.

In testimony whereof, I have signed my name to this specification, in the presence of two subscribing witnesses.

ISAAC E. PALMER.

Witnesses:
   FRED. E. FOWLER,
   REUBEN M. BURR.